Jan. 6, 1959 F. R. SHUMAN, JR., ET AL 2,867,582
SEPARATION OF COMPOUNDS OF VARYING ADSORBABILITIES
Filed April 24, 1956 3 Sheets-Sheet 2

INVENTORS
FRANK R. SHUMAN JR.
JAMES V.D. FEAR
BY
ATTORNEY

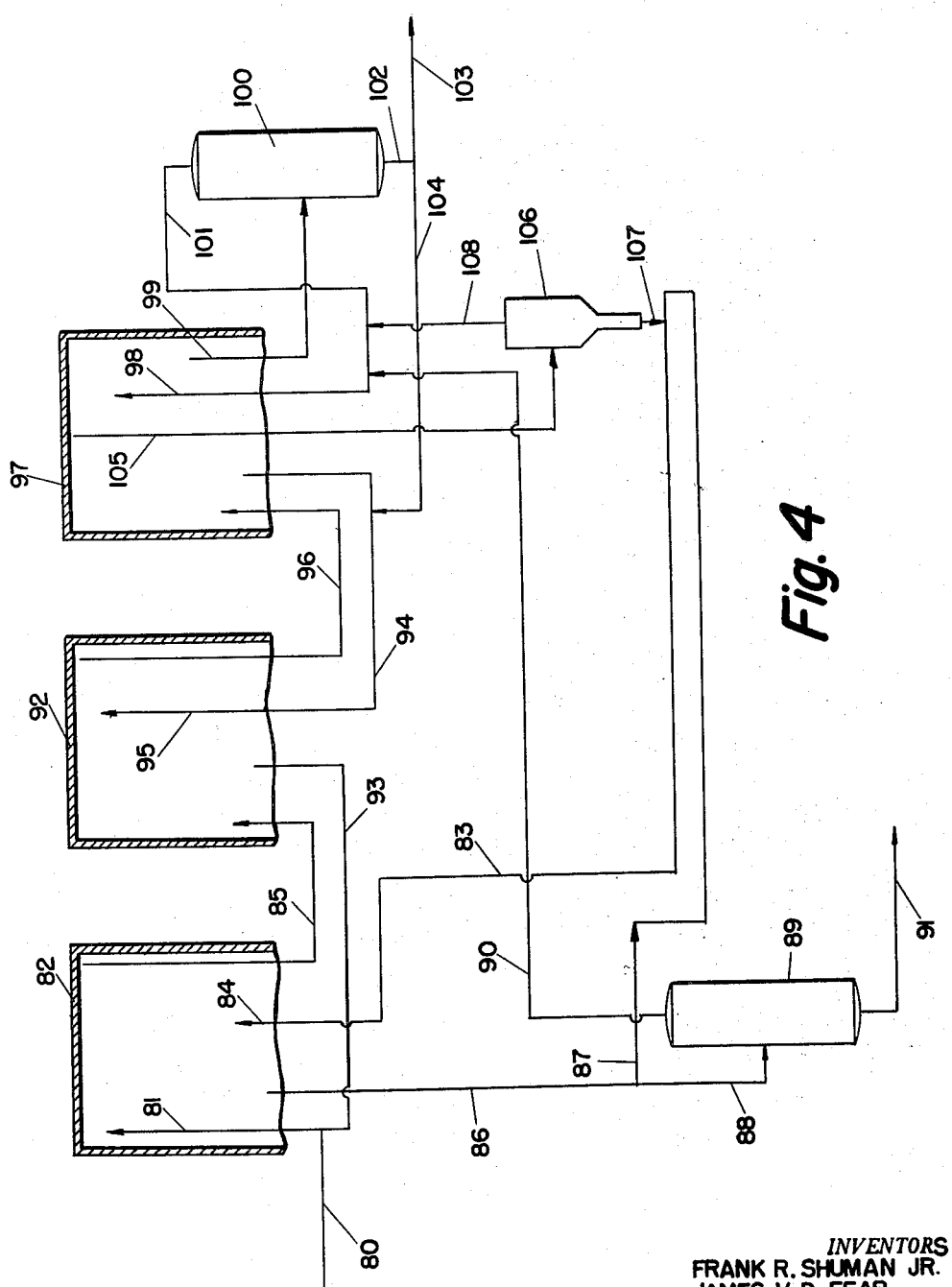

2,867,582

SEPARATION OF COMPOUNDS OF VARYING ADSORBABILITIES

Frank R. Shuman, Jr., Chester Springs, and James Van Dyck Fear, Media, Pa., assignors to Sun Oil Company, Philadelphia, Pa., a corporation of New Jersey Application April 24, 1956, Serial No. 580,380

13 Claims. (Cl. 208—310)

This invention relates to the separation of compounds of varying adsorbabilities from mixtures thereof such as separation of paraffins from olefins, olefins from aromatics, selective separation of aromatics from hydrocarbon mixtures such as catalytic reformates, and separation of polar nonhydrocarbons such as nitrogen compounds from hydrocarbon mixtures; and relates more particularly to a continuous process for such separation using adsorption techniques. While the process hereinafter described is applicable to any of the foregoing separations, it will be described more particularly in connection with the separation of aromatics from gasoline reformates in order to avoid any confusion in terminology.

Cyclic processes for the separation of aromatics from hydrocarbon fractions such as gasoline reformates by selective adsorption of the aromatics on an adsorbent having the characteristics of silica gel, on which aromatics are preferentially adsorbed, have been known for some time. Other adsorbents, such as activated charcoal or activated alumina, may also be used. In such processes, during the first portion of the cycle, the feed is percolated through the adsorbent until the capacity of the adsorbent for feed aromatics is substantially exhausted, at which time, flow of feed is shut off, and a desorbent stream, which is usually a mixture of saturates and aromatics boiling outside the boiling range of the feed, is passed through the adsorbent until substantially all the feed aromatics have been displaced from the adsorbent. Flow of desorbent is then discontinued and fresh feed is passed over the adsorbent to start another cycle. During the first part of the cycle, the effluent consists of feed saturates together with desorbent from the previous desorbing part of the cycle. This effluent is separately collected and subjected to distillation to recover feed saturates and desorbent, the latter being recycled to the process. In the second part of the cycle, the effluent comprises feed aromatics and desorbent. This effluent is also collected separately and fractionated to recover feed aromatics and desorbent for recycle.

While such processes have enjoyed limited commercial success, they are subject to the disadvantages inherent in any cyclic process. In an attempt to avoid these disadvantages, continuous processes have been proposed for continuously separating aromatics from mixtures thereof with saturates by adsorption techniques. One proposal has been to continuously feed finely divided adsorbent in the form of a suspension to the upper part of an adsorption tower and to permit the adsorbent to fall, under the force of gravity, countercurrent to the liquid charge to selectively adsorb the aromatics, while withdrawing a saturate stream from the top of the tower. The adsorbent is recovered from the bottom of the tower and is passed to a similar desorption tower from which feed aromatics are recovered overhead. Another proposal has been to move the adsorbent upwardly through a tower as a moving bed. Adsorption occurs in the lower part of the tower, and desorption is accomplished in the upper part of the tower to provide a continuous process. While these processes allow the use of reflux to theoretically assure a clean separation of feed saturates and aromatics, they have not proven commercially practicable since, in the case in which the adsorbent is allowed to fall by gravity through the feed, the rate of upward movement of the feed through the tower must be low enough to allow the adsorbent to fall through it, and to avoid any carry-over of adsorbent in the saturate fraction recovered from the top of the tower. This requirement severely restricts the throughput through the equipment. In both processes, the adsorbent may tend to channel and flow unevenly through the system. Such channeling or nonuniform movement of the adsorbent will greatly reduce the efficiency of both the adsorption and desorption steps.

It is an object of this invention to provide a continuous process for the separation of aromatic hydrocarbons from saturates by adsorption techniques which permits rapid throughput of the feed and adsorbent through the equipment, while still achieving good separation.

It is a further object of the invention to provide a process for countercurrently contacting a hydrocarbon feed stock comprising aromatics and saturates with an adsorbent which avoids channeling or nonuniform flow of the adsorbent relative to the feed.

We have found that these desirable objects may be attained by conducting the adsorption process in a centrifuge provided with a plurality of inlets and outlets. Finely divided adsorbent such as silica gel, activated alumina or activated charcoal, is admitted to the interior of the centrifuge through an inlet which is located near the hub of the centrifuge; the feed is admitted through an inlet spaced from the adsorbent inlet in the direction of the periphery of the centrifuge wheel, and a reflux stream of feed aromatics is admitted to the centrifuge at a point nearer the periphery than the feed inlet. In the operation of the process the adsorbent will move outwardly under the influence of centrifugal force, making contact with the feed in an adsorption zone which extends from the adsorbent inlet to the feed inlet. The feed will move inwardly and the saturate portion of the feed, from which aromatics have been removed by the adsorbent, is recovered through an outlet passage located nearer the hub of the centrifuge than the feed inlet, for further processing if necessary. In the centrifuge, centrifugal force accentuates the effect of the difference between the specific gravities of the feed and adsorbent so that they can be contacted at very high flow rates without danger of channeling or any other abnormal adsorbent flow characteristics.

The adsorbent, after passing the feed inlet, will enter a stripping zone in which it contacts a reflux stream of feed aromatics, which displaces fresh feed components from the interstitial spaces between the adsorbent particles and desorbs any adsorbed feed saturates. From the stripping zone, the adsorbent will pass to the periphery of the centrifuge wheel, from which it is removed as a slurry in feed aromatics. Reflux aromatics will be fed to the centrifuge in an amount just equal to that necessary to displace interstitial liquid; to desorb feed saturates in order to insure both that a minimum of feed saturates are removed with the adsorbent and that no substantial amount of aromatics is forced inwardly through the adsorption zone to contaminate the saturate product; and to supply sufficient liquid to slurry the gel removed from the centrifuge. The amount of adsorbent admitted to the centrifuge should be enough so that it still retains a considerable capacity of feed aromatics after it enters the stripping zone in order to take best advantage of reflux.

Alternatively, the adsorbent may be removed from the centrifuge in which adsorption takes place without contact with reflux aromatics, and may be passed as a slurry in feed components to a second centrifuge in which it is countercurrently contacted with the reflux stream. In such case, the quantity of reflux aromatics provided should be more than sufficient to displace feed components from the interstitial space and to desorb feed saturates from the adsorbent. A slurry of adsorbent in feed aromatics will be removed from a point near the periphery of the second centrifuge, while feed saturates containing some feed aromatics will be removed from a point near the hub for recycle to the first centrifuge.

The aromatic-adsorbent slurry may be processed to recover the aromatics and to recondition the adsorbent for reuse in any convenient manner. For example, the slurry may be passed to a settling zone from which the adsorbent may be removed as a sludge. The sludge is then passed to the top of a stripping tower in which the adsorbent falls in countercurrent contact to a stream of hot stripping gas such as butane, propane or oxygen-free flue gas. Adsorbent from which feed aromatics have been removed by vaporization is recovered from the bottom of the tower for recycle to the centrifuge, while aromatics and stripping gas are removed overhead and passed to a condenser and separator from which an aromatic product is recovered, separated stripping gas being reheated and recycled to the stripping tower. Preferably cooling coils, which may form part of a waste heat boiler system, are located in the lower part of the stripping tower in order to recover heat from the hot regenerated adsorbent, and to cool it prior to recycle to the adsorption step.

Alternatively, desorption may be carried out in a centrifuge in a manner similar to the adsorption step. In this case, the slurry of adsorbent in feed aromatics is passed into the interior of the wheel of a second centrifuge, while desorbent, preferably an aromatic compound boiling either higher or lower than the feed aromatics, is passed into the wheel at a point near the periphery. The desorbent will flow toward the hub of the wheel countercurrently to the adsorbent, and will displace feed aromatics from the desorbent, carrying them back towards the hub. The liquid component of the slurry is removed from the wheel at a point inward of the slurry inlet; a mixture of feed aromatics and desorbent is recovered from a point between the slurry inlet and the desorbent inlet for further processing to separate desorbent and feed aromatics, and a slurry of adsorbent in desorbent liquid is removed from the periphery of the wheel for recycle to the first centrifuge.

In order that those skilled in the art may more fully understand the nature of our invention and the method of carrying it out, it will be more fully described in connection with the accompanying drawings in which:

Fig. 4 is a schematic flow sheet of a form of our invention in which refluxing with feed aromatics is carried out in a separate centrifuge.

Figure 2:
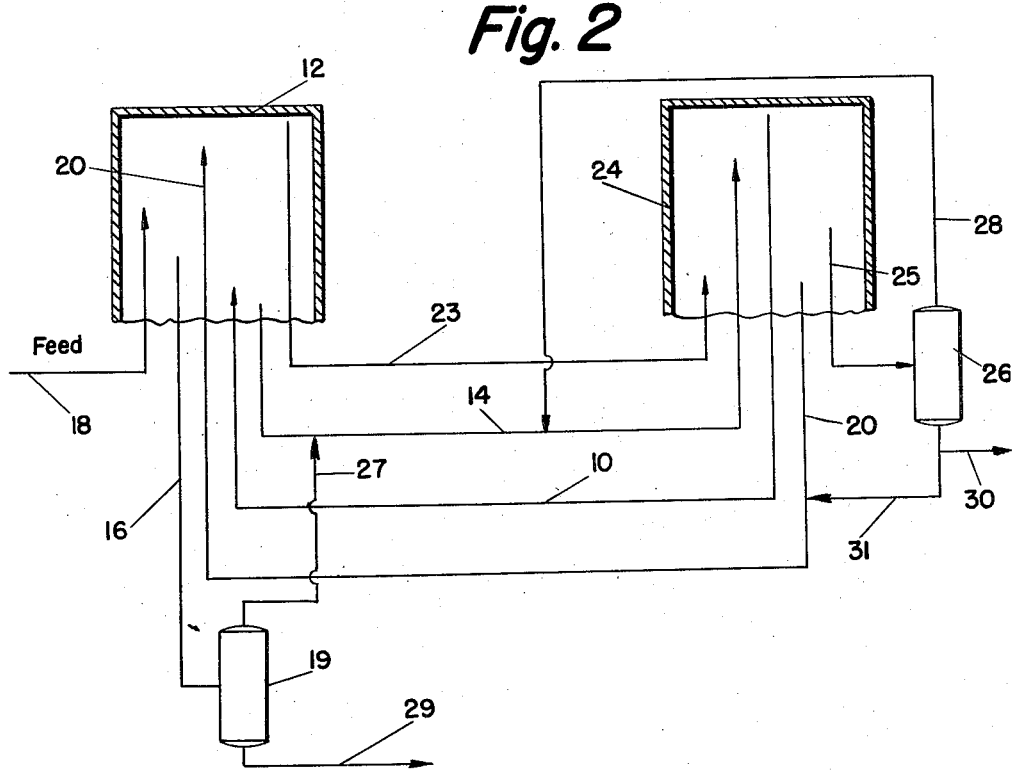
Fig. 2 is a schematic flow sheet of one form of our invention, in which desorption of feed aromatics is accomplished by treatment with a desorbing liquid.
Figure 3:
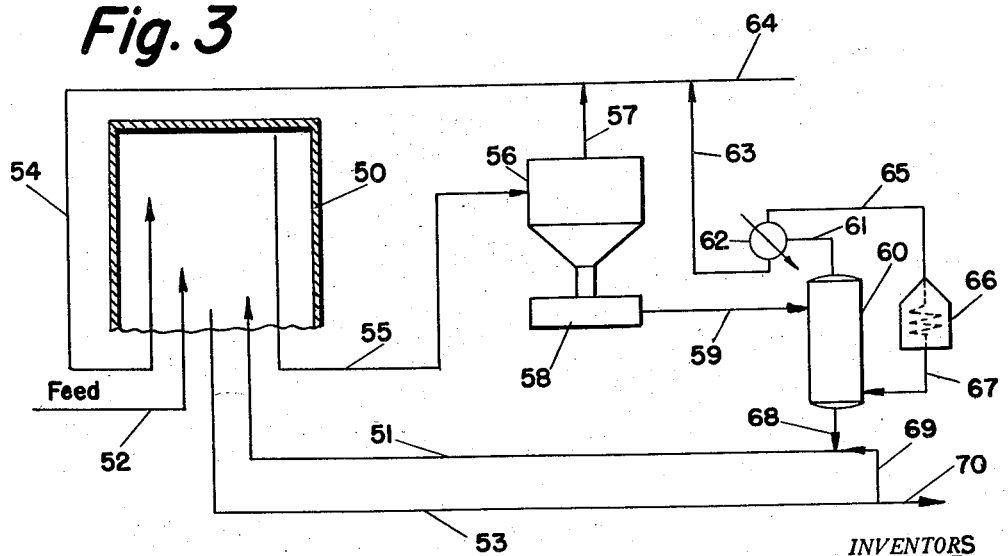
Fig. 3 is a schematic flow sheet of a form of our invention in which feed aromatics are removed from the adsorbent by vaporization.

It will be understood that in Figs. 2, 3 and 4, the relative sizes of the pieces of equipment shown are in no way related to their actual sizes, the size of the centrifuge wheels being greatly exaggerated for purposes of clarity. Also, various pieces of equipment, such as pumps, valves and driving means for the centrifuges, which are not necessary to an understanding of the invention, have also, for purposes of clarity, been omitted from the drawings.

Figure 1:
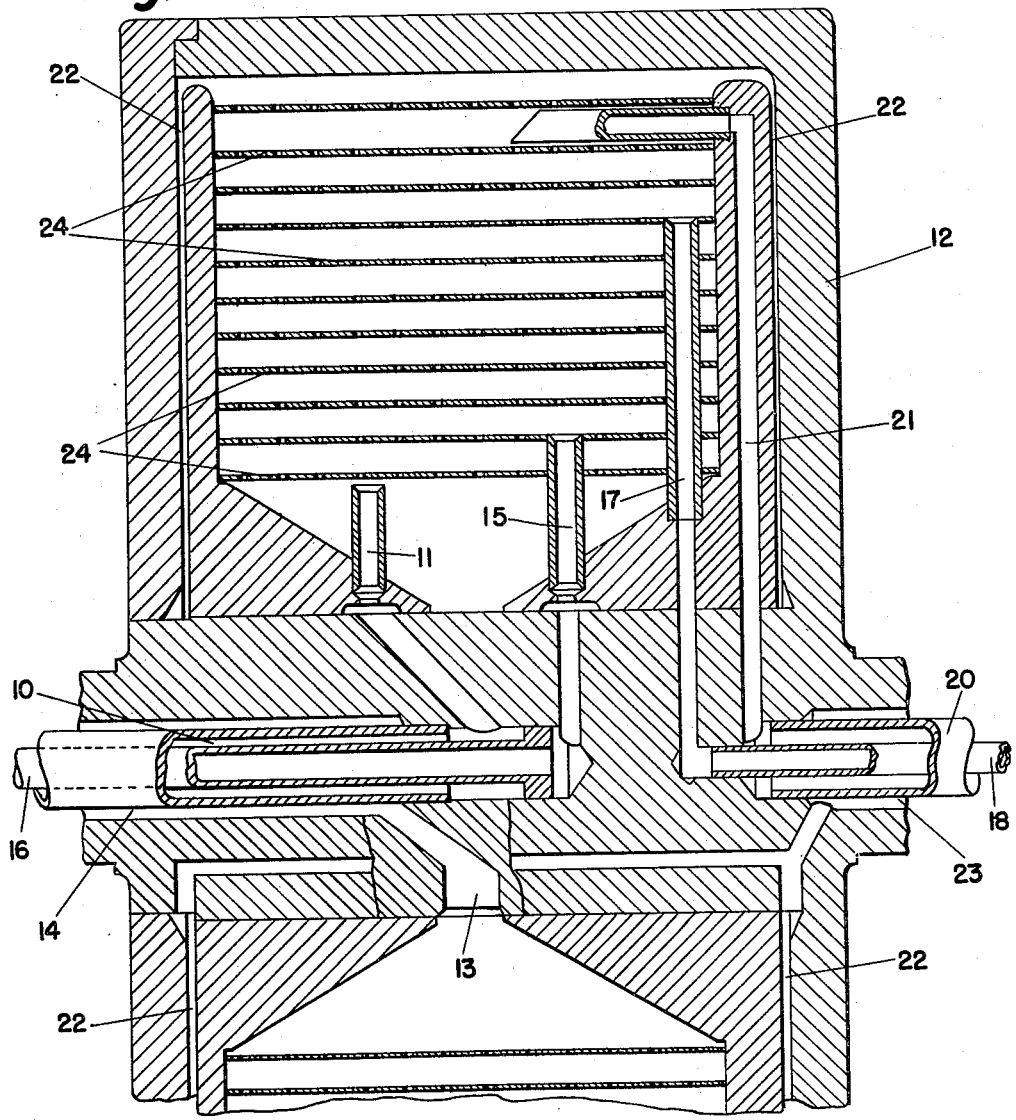
Fig. 1 is a fragmentary cross-section, partly broken away, of a centrifuge wheel of a type adapted for use in our invention, taken along the axis of the wheel hub.

Referring now to Fig. 1 and 2, a slurry of finely divided adsorbent material suspended in desorbent liquid is continuously passed through line 10 and inlet passage 11 to the interior of centrifuge wheel 12. Under the influence of centrifugal force, the adsorbent will move outwardly towards the periphery of wheel 12, while the desorbent liquid is withdrawn at the hub of the wheel through passage 13 and outlet line 14. In the course of its travel towards the periphery, the adsorbent will pass the mouth of outlet passage 15, which connects with line 16, and will enter an adsorption zone which extends from the mouth of outlet passage 15 to the mouth of inlet passage 17, which connects with inlet line 18 through which fresh feed comprising both saturated and aromatic hydrocarbons is continuously admitted to the centrifuge 12. In the case illustrated in all the figures, the desorbent is an aromatic hydrocarbon which boils below and outside the boiling range of the feed so that desorbent may readily be separated from feed components by fractional distillation. In this adsorption zone, the adsorbent will flow outwardly countercurrently to the fresh feed. Contact with the fresh feed will cause the feed aromatics to displace desorbent from the adsorbent, and the liberated desorbent, together with feed saturates, is removed from the centrifuge via outlet passage 15 and line 16, and is passed to a distillation tower 19, in which the desorbent and feed saturates are separated by distillation.

After passing the mouth of feed inlet passage 17, the adsorbent is contacted with recycle feed aromatics introduced through line 20 and inlet passage 21. The recycle aromatics are fed to the centrifuge in an amount sufficient to displace inwardly feed saturates from the liquid surrounding the adsorbent, and to displace any remaining desorbent or feed saurates adsorbed on the adsorbent, but insufficient in amount to mix with the feed saturates so as to contaminate the product removed through line 16. After the adsorbent reaches the periphery of wheel 12, it is removed therefrom as a slurry in feed aromatics through outlet passage 22 and line 23. It will be understood that sufficient pressure is maintained in wheel 12, as by back pressure valves in lines 14 and 16, to force the slurry of adsorbent out of the wheel. It will also be noted that wheel 12 is provided with a series of apertured baffles 24 to assure efficient contacting of the adsorbent with the various liquids through which it passes.

Referring now more particularly to Fig. 2, the slurry of adsorbent in feed aromatics is taken from centrifuge wheel 12 through line 23 and is passed to the interior of a second centrifuge wheel 24, at a point spaced from the hub. The construction of centrifuge wheel 24 is similar to the construction illustrated in Fig. 1, except that inlet passage 17 and line 18 are omitted. In centrifuge 24, line 23 corresponds to line 10 and inlet passage 11; line 20 corresponds to outlet passage 13 and line 14; line 14 corresponds to line 20 and passage 21; line 25 corresponds to passage 15 and line 16; and line 10 corresponds to passages 22 and line 23.

In this wheel, the adsorbent, with its adsorbed feed aromatics, is thrown outwardly by centrifugal force while the liquid component of the slurry, feed aromatics, is removed from the centrifuge 24 at a point near the hub and is returned through line 20 to centrifuge wheel 12 to serve as reflux liquid therein. In centrifuge wheel 24, the adsorbent will flow in countercurrent contact with desorbent, which is introduced through line 14 at a point near the periphery of the wheel. The desorbent will displace interstitial feed aromatics and will also displace feed aromatics adsorbed on the adsorbent. A mixture of desorbent and feed aromatics is recovered through line 25 and is taken to distillation tower 26 where it is separated into a desorbent fraction and an aromatic fraction, and a slurry of adsorbent in desorbent liquid is recovered at the periphery of wheel 24 and returned to wheel 12 through line 10. Desorbent recovered in distillation towers 19 and 26 is recycled through lines 27 and 28 respectively to admixture with desorbent in line 14, while saturate product is taken through line 29 to storage, and aromatic product is recovered through line 30, part of the product being recycled through line 31 to line 20.

While for purpose of illustration it has been heretofore assumed that the desorbent is lower boiling than the feed, it will be understood that in the event that the feed is a low-boiling fraction such as $C_6$–$C_7$ cut, the desorbent will be a heavier aromatic, such as a mixed xylene fraction. In this case, products instead of desorbent will be taken overhead through lines 27 and 28, while desorbent will be taken off as bottoms through lines 29 and 30; lines 27 and 28 will lead to storage; and lines 29 and 30 will connect with line 14.

A different form of the invention, utilizing another method of desorption, is schematically illustrated in Fig. 3. In this form of the invention, gel slurried in feed saturates is admitted to centrifuge wheel 50 through line 51, while fresh feed is admitted to the wheel through line 52. Feed saturates are removed from the centrifuge through line 53. The gel will travel outwardly toward the periphery of wheel 50 and will during its journey contact the feed in the zone between the gel inlet and the feed inlet to extract aromatics therefrom by adsorption on the gel. After passing the feed inlet, the gel will enter a stripping zone in which it will contact reflux feed aromatics introduced through line 54 in order to displace interstitial feed saturates and to desorb feed saturates from the gel.

A slurry of gel in feed aromatics is removed through line 55, and is passed to settler 56, in which the gel settles out as a sludge on the bottom, supernatant liquid being removed through line 57, which connects with line 54, for recycle to wheel 50. The gel sludge which collects in the bottom of settler 56 is picked up by a screw conveyor 58 and is forced through line 59 to desorption tower 60, in which it is contacted countercurrently by a stream of hot inert gas, such as a normally gaseous hydrocarbon or oxygen-free flue gas, at a temperature sufficiently high and in a quantity sufficiently great to boil the feed aromatics off the adsorbent. Alternatively, the sludge could be picked up at the bottom of separator 56 by a stream of hot gas and could be carried by the gas stream to tower 60.

Vaporized aromatics and carrier gas are recovered overhead through line 61 and are passed to condenser 62 from which aromatics are recovered as liquid through line 63. Sufficient aromatics to balance the amount in the feed are taken off to storage through line 64, while the balance is returned to centrifuge 50 through line 54. The gas recovered from condenser 62 is taken through line 65, heated in furnace 66, and is returned to the base of desorption tower 60 through line 67.

Adsorbent, from which aromatics have been removed, is taken from desorption tower 60 through line 68 and is slurried with feed saturates diverted from line 53 through line 69, the slurry being returned to centrifuge wheel 50 through line 51. An amount of saturate product equal to the saturate content of the feed is withdrawn from the process through line 70.

Referring now to Fig. 4, a still different form of the invention is shown in which the quantity of desorbent passed to the adsorption centrifuge is minimized, while retaining the advantages of liquid phase desorption, and the refluxing operation is carried out in a separate centrifuge in order to minimize contamination of product saturates with aromatics. In this embodiment of the invention, feed is introduced from storage through line 80 and inlet line 81 to centrifuge wheel 82 at a point spaced from the periphery thereof. A slurry of adsorbent material in a mixture of desorbent and feed saturates as recovered in a later stage of the process is introduced via line 83 and inlet line 84 to centrifuge wheel 82 at a point spaced toward the hub thereof from the feed inlet 81. The adsorbent will move, under the influence of centrifugal force, outwardly toward the periphery of wheel 82, countercurrently contacting the feed. Adsorbent rich in adsorbed feed aromatics as a slurry in feed components, is removed from the periphery of wheel 82 through line 85, while a mixture of feed saturates and desorbent is removed from a point near the hub of wheel 82 through line 86. This latter stream is divided into two parts, one being diverted through line 87 to admixture with regenerated adsorbent for recycle to wheel 82 through line 83, the other, which comprises feed saturates in an amount about equal to that introduced with the fresh feed, being passed through line 88 to a distillation tower 89 from which desorbent is recovered through line 90, and product saturates are recovered through line 91.

The slurry of rich adsorbent in feed components is taken through line 85 to a second centrifuge wheel 92, to which it is introduced at a point spaced from the hub. The liquid portion of the slurry is withdrawn from the hub of wheel 82 through line 93, and is recycled to admixture with feed in line 80, while the rich adsorbent moves toward the periphery of wheel 92 under the influence of centrifugal force, and passes through a pool of reflux feed aromatics introduced through line 94 and inlet line 95. The reflux aromatics so introduced will displace inwardly feed components introduced through line 85, and will strip therefrom any feed saturates which may still be adsorbed on the adsorbent, so that a slurry of adsorbent in feed aromatics, essentially free of feed saturates, may be removed from the periphery of wheel 92 through line 96 for passage to the desorption stage of the process.

Desorption of feed aromatics from the adsorbent and recovery of the latter for recycle may be accomplished in the same manner as described in connection with Figs. 2 and 3. The variation in processing illustrated in Fig. 4 is an improvement over that shown in Fig. 2 in that less desorbent is introduced into the adsorption centrifuge than in the adsorbent recovery system illustrated in Fig. 2. In this variation, the slurry removed from wheel 92 through line 96 is passed to a third centrifuge wheel 97, entering the wheel at a point spaced from the hub thereof. In this wheel, as in the wheel illustrated in Fig. 2, the adsorbent, with its adsorbed feed aromatics, is thrown outwardly by centrifugal force while the liquid component of the slurry, feed aromatics, is removed from wheel 97, at a point nearer the hub thereof than the slurry inlet, and is returned as reflux through line 94 to wheel 92. In wheel 97, the adsorbent will flow in countercurrent contact with desorbent which is introduced through inlet line 98 at a point near the periphery of wheel 97. The desorbent will displace interstitial feed aromatics and will also displace feed aromatics adsorbed on the desorbent. A mixture of desorbent and feed aromatics is recovered through line 99, at a point between the slurry and desorbent inlets, and is taken to fractionation tower 100, from which a desorbent fraction is recovered through line 101, which connects with desorbent inlet 98. Feed aromatics are recovered through line 102, and a portion thereof, in amount about corresponding to the aromatics in the fresh feed to the system, is sent to storage through line 103, while the balance, if any, is recycled to the process through line 104, which connects with aromatics reflux line 94.

Adsorbent from which feed aromatics have been substantially completely removed, is recovered from the periphery of wheel 97 through line 105 as a slurry in desorbent and is passed to settler 106, in which the adsorbent settles out as a sludge at the bottom. The sludge is continuously removed through line 107 and is mixed with sufficient fluid from line 87 to form a free-flowing slurry, which is recycled to wheel 82 through line 83. Supernatant desorbent is removed from settler 106 through line 108, and is mixed with desorbent in line 101 for recycle to wheel 97. Desorbent recovered from tower 89 is also passed through line 90 to admixture with the desorbent in line 101.

As an example of the relative quantities of feed, reflux, desorbent and adsorbent required in practicing our invention, the following may be considered typical when following the scheme shown in Fig. 3. Assuming that the feed is a kerosene boiling range petroleum fraction containing 20% aromatics and 80% saturates, for every 100 barrels of feed introduced through line 52 to centrifuge 50, a quantity of silica gel having a pore volume of 70 barrels, slurried in liquid comprising 7.5 barrels of aromatics and 692.5 barrels of saturates will be introduced to centrifuge 50 through line 51. 780 barrels of liquid comprising 771.5 barrels of saturates and 8.5 barrels of aromatics are recovered through line 53 of which 80 barrels, consisting of 79 barrels of saturates and one barrel of aromatics are taken off to storage as saturate product, the balance being recycled to centrifuge 50 as slurrying liquid for the gel. Six hundred barrels of aromatic reflux, comprising 570 barrels of aromatics and 30 barrels of saturates, are cycled to centrifuge 50 through line 54, while a slurry comprising gel having a pore volume of 70 barrels, 31 barrels of saturates and 589 barrels of aromatics, are withdrawn from centrifuge 50 through line 55. An aromatic product comprising 19 barrels of aromatics and 1 barrel of saturates is withdrawn to storage through line 64, the balance of the liquid portion of the slurry being recycled through lines 57 and 54 as aromatic reflux.

As may be observed from the foregoing, we have provided a continuous process for the adsorptive separation of aromatic from saturate hydrocarbons, in which the adsorbent is moved through the liquids to be contacted therewith under the influence of centrifugal force, which so greatly accentuates the difference in specific gravity between the adsorbent and the liquid that channeling or other discontinuous flow of adsorbent is avoided, while the adsorbent may be moved through the liquid at speeds sufficient to insure high throughput while maintaining steady state conditions in the centrifuge. Speed of movement of the adsorbent may, of course, be easily regulated by regulating the speed of rotation of the centrifuge, since the faster the wheel rotates, the faster will the adsorbent move toward the periphery of the wheel. In this manner, a delicate control may be had over the time of contact of the adsorbent with the various liquids through which it moves. This control is, of course, not possible in those prior art processes which utilize the constant force of gravity to move the adsorbent through the liquid.

Since the present invention is not directed to the apparatus in which the process is performed but to the process itself, only so much of the apparatus is illustrated as is necessary to an understanding of the operation of the process. Any type centrifuge may be used provided only that it is provided with means for introducing and withdrawing a plurality of feed and product streams at different points in the wheel. As those skilled in the art will recognize, Fig. 1 shows by way of illustration a modified Podbielniak centrifugal contactor. Such contactors will be provided with means (not shown) for rotating the centrifuge wheel and with suitable seals and connecting lines associated with the internal passages of the centrifuge to allow the feed streams to be introduced to the centrifuge and to allow product streams to be withdrawn therefrom. Also, in order not to unnecessarily clutter up the drawing, but one passage has been illustrated for each of the streams. In actual practice, a plurality of such passages would be provided for each stream, arranged symmetrically about the hub in order to balance the wheel and allow more even distribution of feed and withdrawal of product. In addition, distributor heads or collector troughs, as the case might be, would be provided at the open ends of passages 11, 15 and 17.

As stated in the opening paragraph, the process may be applied to any mixture of compounds which have differing adsorbabilities. In any such system, the more readily adsorbed compounds will be adsorbed in the same manner as the aromatics hereinbefore described, and the compounds of less adsorbability will behave in the same manner as the saturates of an aromatic-saturate mixture. For example, if it is desired to separate olefins from diolefins, the more highly adsorbable diolefins would behave like aromatics, while the olefins would behave like saturates. Similarly, if it is desired to separate highly adsorbable impurities from aromatics, the impurities will be preferentially adsorbed, and the aromatics will be processed in the same manner as the saturates discussed above. In any of such separations, it will be understood that the desorbent chosen will be of a character such as to desorb the more highly adsorbable component of the mixture.

We claim:

1. A process for separating mixtures of compounds of varying adsorbabilities which comprises continuously introducing a feed stock comprising material of relatively high adsorbability and material of relatively low adsorbability to the interior of a centrifuge wheel at a point intermediate the hub and periphery of said wheel, continuously introducing finely divided adsorbent material on which the material of relatively high adsorbability is more readily adsorbed than the material of relatively low adsorbability to the interior of the centrifuge wheel at a point nearer the hub thereof than the point of introduction of the feed stock, causing the adsorbent material to move countercurrently to the feed stock under the influence of centrifugal force, withdrawing adsorbent material having adsorbed thereon material of relatively high adsorbability from a point in the centrifuge wheel nearer the periphery thereof than the point of introduction of the feed stock, recovering material of relatively high adsorbability from the so withdrawn adsorbent material, and withdrawing a stream substantially depleted in material of relatively high adsorbability from a point in the centrifuge wheel nearer the hub of the wheel than the point of introduction of the adsorbent material.

2. A process for the separation of aromatic hydrocarbons from saturated hydrocarbons which comprises continuously introducing a feed stock comprising aromatic and saturated hydrocarbons to the interior of a centrifuge wheel at a point intermediate the hub and periphery of said wheel, continuously introducing finely divided adsorbent material on which aromatics are more readily adsorbed than saturates to the interior of the centrifuge wheel at a point nearer the hub thereof than the point of introduction of the feed stock, causing the adsorbent material to move countercurrently to the feed stock under the influence of centrifugal force, withdrawing adsorbent material containing adsorbed feed aromatics from a point in the centrifuge wheel nearer the periphery thereof than the point of introduction of the feed stock, recovering feed aromatics from the so withdrawn adsorbent material, and withdrawing a hydrocarbon stream substantially depleted in feed aromatics from a point in the centrifuge wheel nearer the hub of the wheel than the point of introduction of the adsorbent material.

3. The process according to claim 2 including introducing to the centrifuge wheel, at a point between the point of introduction of the feed and the point of withdrawal of the adsorbent material, a recycle stream of feed aromatics in an amount sufficient to displace feed saturates from the interstitial spaces of the adsorbent material, and withdrawing the adsorbent material as a relatively thin slurry in feed aromatics.

4. The process according to claim 3 including passing the slurry of adsorbent material in feed aromatics to a settling zone, separating supernatant liquid and returning it to the centrifuge as recycle feed aromatics, separating a sludge comprising adsorbent material and feed aromatics, heating the sludge to a temperature sufficiently high to vaporize adsorbed feed aromatics therefrom, condensing and recovering feed aromatics, and recycling the adsorbent, substantially free from feed aromatics, to the centrifuge wheel.

5. The process according to claim 4 in which the adsorbent material is recycled to the centrifuge wheel as a slurry in feed saturates.

6. A process for the separation of aromatic hydrocarbons from saturated hydrocarbons which comprises continuously introducing a feed stock comprising aromatic and saturated hydrocarbons to the interior of a first centrifuge wheel at a point intermediate the periphery and the hub of said wheel, continuously introducing a slurry, consisting of finely divided adsorbent material on which aromatics are more readily adsorbed than saturates in a desorbent consisting of a hydrocarbon fraction boiling outside the boiling range of the feed, to the interior of said first centrifuge wheel at a point nearer the hub thereof than the point of introduction of the feed, causing the adsorbent material to move countercurrently to the feed stock under the influence of centrifugal force, withdrawing a first liquid stream consisting essentially of desorbent from a point in said first centrifuge wheel nearer the hub thereof than the point of introduction of the slurry, withdrawing a second liquid stream comprising feed saturates and desorbent from a point in said first centrifuge wheel located between the point of introduction of the feed and the point of introduction of the slurry, separately recovering feed saturates and desorbent from said second liquid stream, withdrawing the absorbent material containing adsorbed feed aromatics from a point in said first centrifuge wheel nearer the periphery thereof than the point of introduction of the feed stock and recovering feed aromatics from the absorbent material.

7. The process according to claim 6 including introducing to said first centrifuge wheel, at a point between the point of introduction of the feed and the point of withdrawal of the adsorbent material, a recycle stream of feed aromatics, in an amount sufficient to displace feed saturates and desorbent from the interstitial spaces of the adsorbent material, and withdrawing the adsorbent material as a relatively thin slurry in feed aromatics.

8. The process according to claim 7 including the step of continuously introducing the slurry of adsorbent material withdrawn from the first centrifuge wheel to a second centrifuge wheel at a point intermediate the hub and periphery of said second wheel, continuously introducing desorbent boiling outside the boiling range of the feed to the second centrifuge wheel at a point nearer the periphery thereof than the point of introduction of the slurry, causing the adsorbent material to move countercurrently to the desorbent under the influence of centrifugal force, withdrawing a third liquid stream consisting largely of feed aromatics from a point in said second centrifuge wheel nearer the hub thereof than the point of introduction of said slurry, withdrawing a fourth liquid stream from a point in said second centrifuge wheel located between the point of introduction of the slurry of adsorbent material in feed aromatics and the point of introduction of the desorbent, separating said fourth liquid stream into a desorbent fraction and a feed aromatics fraction, withdrawing a slurry of adsorbent material in desorbent from a point in said second centrifuge wheel nearer the periphery thereof than the point of introduction of the desorbent, and recycling said so withdrawn slurry to the first centrifuge wheel at a point nearer the hub thereof than the point of introduction of the feed stock.

9. The process according to claim 8 in which the recycle stream of feed aromatics introduced into the first centrifuge wheel comprises said third liquid stream.

10. The process according to claim 9 in which the desorbent introduced to the second centrifuge wheel comprises said first liquid stream, desorbent recovered from said second liquid stream, and desorbent separated from said forth liquid stream.

11. A process for the separation of aromatic hydrocarbons from saturated hydrocarbons which comprises continuously introducing a feed stock comprising aromatic and saturated hydrocarbons to the interior of a first centrifuge wheel at a point intermediate the hub and periphery of the wheel, continuously introducing finely divided absorbent material on which aromatics are more readily adsorbed than saturates to the interior of the centrifuge wheel at a point nearer the hub thereof than the point of introduction of the feed stock, causing the adsorbent material to move countercurrently to the feed stock under the influence of centrifugal force, withdrawing a hydrocarbon stream substantially depleted in feed aromatics from a point in the centrifuge wheel nearer the hub of the wheel than the point of introduction of the adsorbent material, withdrawing a slurry of adsorbent material having feed aromatics adsorbed thereon from a point in the centrifuge wheel near periphery thereof, the liquid portion of said slurry comprising feed components, continuously introducing said slurry to the interior of a second centrifuge wheel at a point spaced from the hub thereof, continuously introducing a reflux stream comprising feed aromatics to said second centrifuge wheel at a point nearer the periphery thereof than the point of introduction of the slurry, causing adsorbent material to move countercurrently to the reflux stream under the influence of centrifugal force, withdrawing a liquid stream comprising feed components from a point in said second centrifuge wheel near the hub thereof and recycling said liquid stream to said first centrifuge wheel as a component of the feed thereto, withdrawing from said centrifuge wheel, at a point near the periphery thereof, a slurry comprising adsorbent material and feed aromatics, separating feed aromatics from said adsorbent material, recovering adsorbent material substantially free of feed aromatics, and recycling the same to said first centrifuge wheel.

12. The process according to claim 11 including continuously passing the slurry of adsorbent material in feed aromatics withdrawn from said second centrifuge to a settling zone, separating supernatant liquid and returning it to said second centrifuge wheel as a component of the reflux stream, separating a sludge comprising adsorbent material and feed aromatics, heating the sludge to a temperature sufficiently high to vaporize adsorbed feed aromatics therefrom, condensing and recovering feed aromatics, and recycling the adsorbent, substantially free from feed aromatics, to said first centrifuge wheel.

13. The process according to claim 11 including continuously introducing the slurry of adsorbent material in feed aromatics withdrawn from said second centrifuge wheel to a third centrifuge wheel at a point intermediate the hub and periphery of said third wheel, continuously introducing desorbent boiling outside the boiling range of the feed aromatics to the third centrifuge wheel at a point nearer the periphery thereof than the point of introduction of the slurry, causing the adsorbent material to move countercurrently to the desorbent under the influence of centrifugal force, withdrawing a stream comprising feed aromatics from a point in said third centrifuge wheel nearer the hub thereof than the point of introduction of said slurry and recycling the same to the second centrifuge wheel as a component of the reflux stream, withdrawing a stream comprising feed aromatics and desorbent from said third centrifuge wheel at a point intermediate the points of introduction of the slurry and the desorbent, and recovering feed aromatics therefrom, recovering a slurry of adsorbent material in desorbent from a point near the periphery of said third centrifuge wheel, said adsorbent material being substantially free of adsorbed feed aromatics, passing said slurry to a settling zone, recovering supernatant liquid and a sludge comprising adsorbent material from the settling zone, slurrying said sludge in a liquid comprising feed, saturates and desorbent, and recycling the same to said first centrifuge wheel.

References Cited in the file of this patent

UNITED STATES PATENTS

| | | |
|---|---|---|
| 1,657,941 | Sharples et al. | Jan. 31, 1928 |
| 2,093,645 | Podbielniak | Sept. 21, 1937 |
| 2,507,893 | De Lisle | May 16, 1950 |
| 2,614,133 | Ockert | Oct. 14, 1952 |
| 2,646,451 | Rommel | July 21, 1953 |
| 2,678,133 | Thayer et al. | May 11, 1954 |
| 2,696,307 | Rush | Dec. 7, 1954 |

FOREIGN PATENTS

| | | |
|---|---|---|
| 1,110,315 | France | Feb. 10, 1956 |